United States Patent
Graziosi

(10) Patent No.: US 11,107,249 B2
(45) Date of Patent: Aug. 31, 2021

(54) POINT CLOUD GLOBAL TETRIS PACKING

(71) Applicant: SONY CORPORATION, Tokyo (JP)

(72) Inventor: Danillo Graziosi, San Jose, CA (US)

(73) Assignee: Sony Group Corporation, Tokyo (JP)

( * ) Notice: Subject to any disclaimer, the term of this patent is extended or adjusted under 35 U.S.C. 154(b) by 35 days.

(21) Appl. No.: 16/655,673

(22) Filed: Oct. 17, 2019

(65) Prior Publication Data
US 2020/0302648 A1 Sep. 24, 2020

Related U.S. Application Data

(60) Provisional application No. 62/819,856, filed on Mar. 18, 2019.

(51) Int. Cl.
*G06K 9/00* (2006.01)
*G06T 9/00* (2006.01)
*G06K 9/62* (2006.01)

(52) U.S. Cl.
CPC .............. *G06T 9/00* (2013.01); *G06K 9/6215* (2013.01)

(58) Field of Classification Search
CPC .. G06K 9/6407; G06K 9/2009; G06K 9/6423; G06K 9/6476; G06K 9/00; G06K 9/00084; G06K 9/46; G06K 9/6215; G06T 7/001; G06T 9/00; G06F 17/30249; G06F 17/30271; G06F 17/30545
See application file for complete search history.

(56) References Cited

U.S. PATENT DOCUMENTS

| | | | |
|---|---|---|---|
| 7,003,136 B1 * | 2/2006 | Harville | G06K 9/00201 348/169 |
| 8,577,538 B2 * | 11/2013 | Lenser | G05D 1/0038 701/28 |
| 8,744,744 B2 * | 6/2014 | Takagi | G01S 13/931 701/301 |
| 9,020,637 B2 * | 4/2015 | Schnittman | G05D 1/0242 700/253 |
| 10,909,726 B2 * | 2/2021 | Mammou | G06T 17/00 |
| 2013/0084008 A1 * | 4/2013 | Othmezouri | G06K 9/6297 382/180 |

(Continued)

FOREIGN PATENT DOCUMENTS

WO 2019055963 A1 3/2019

OTHER PUBLICATIONS

"V-PCC Codec description", 127. MPEG Meeting; Jul. 8, 2019-Jul. 12, 2019; Gothenburg; (Motion Picture Expert Group or ISO/IEC JTC1/SC29/WG11), No. N18674 Sep. 25, 2019 (Sep. 25, 2019), XP030206834, Retrieved from the Internet; URL:http://phenis.int-evry.fr/mpeg/doc_end_user/documents/127_Gothenburg/wg11/w18674.zip N18674_VPCC_TM7_AlgorithmDescription_d1.docx [retrieved on Sep. 25, 2019] section 2.1.3.12.

(Continued)

*Primary Examiner* — Amir Alavi
(74) *Attorney, Agent, or Firm* — Haverstock & Owens LLP

(57) ABSTRACT

A method of mapping 3D point cloud data into 2D surfaces for further efficient temporal coding is described herein. Point cloud global tetris packing utilizes 3D surface patches to represent point clouds and performs temporally consistent global mapping of 3D patch surface data into 2D canvas images. Point cloud global tetris packing includes calculating an accumulated occupancy map and a weight of each patch according to the matched patches.

17 Claims, 7 Drawing Sheets

(56) References Cited

U.S. PATENT DOCUMENTS

| | | | | |
|---|---|---|---|---|
| 2016/0292394 | A1* | 10/2016 | Ahuja | G16B 15/00 |
| 2020/0021847 | A1* | 1/2020 | Kim | H04N 19/597 |
| 2020/0111237 | A1* | 4/2020 | Tourapis | H04N 19/597 |
| 2020/0153885 | A1* | 5/2020 | Lee | G06T 9/001 |
| 2020/0302648 | A1* | 9/2020 | Graziosi | H04N 19/597 |
| 2020/0380270 | A1* | 12/2020 | Cox | G06K 9/00798 |

OTHER PUBLICATIONS

Danillo Graziosi (Sony) et al.: [V-PCC] New Contribution on Patch Packing, 126. MPEG Meeting; Mar. 25, 2019-Mar. 29, 2019; Geneva; (Motion Picture Expert Group or ISO/IEC JTC1/SC29/WG11), No. m47499 Mar. 23, 2019 (Mar. 23, 2019), XP030211542, Retrieved from the Internet: URL:http://phenis.int-evry.fr/mepg/doc_end_user/documents/126_Geneva/wg11/m47499-v2-m47499_v2.zip m47499_v2.pptx [retrieved on Mar. 23, 2019] the whole document.

Zakharchenko: "V-PCC Codec description", Mar. 13, 2019 (Mar. 13, 2019), XP055622270, Retrieved from the Internet: URL:http://phenix.int-evry.fr/mpeg/[retrieved on Sep. 13, 2019] sections 2.1. 2.6-2.1.2.7.

Zhang Dejun et al: "[PCC] TMC2 CE2.6 results", 122.MPEG Meetings; Apr. 16, 2018-Apr. 20, 2018; San Diego; (Motion Picture Expert Group or ISO/IEC JTC1/SC29/WG11), No. m42712, Apr. 11, 2018 (Apr. 11, 2018), XP030071051, sections 2 and 5.

Anonymous: "Doubly linked list—Wikipedia", Oct. 22, 2018 (Oct. 22, 2018), XP055687285, Retrieved from the Internet: URL:https://en.wikipedia.org/w/index/php?title=Doubly_linked_list&oldid=865160856 [retrieved on Apr. 20, 2020] p. 1.

Schwarz Sebastain et al: "Emerging MPEG Standards from Point Cloud Compresson", IEEE Journal on Emerging and Selected Topics Incircuits and Systems, IEEE, Piscatawy, NU, USA, vol. 9, No. 1, Mar. 11, 2019 (Mar. 11, 2019), pp. 133-148, XP011714044, ISSN: 2156-3357, DOI: 10.1109/JETCAS.2018-2885981 [Retrieved on Mar. 8, 2019] section VII.

International Search Report dated May 4, 2020 for PCT Application No. PCT/IB2020/052033.

Chen, Long et al., "Transforming a 3-D LiDAR Point Cloud Into a 2-D Dense Depth Map Through a Parameter Self-Adaptive Framework", IEEE Transactions on Intelligent Transportation Systems, http//www.ieee.org/publications/rights/index.html, 2016, IEEE.

* cited by examiner

| C2_ra - lossy geometry, lossy attributes [inter, random access] | | Geom. BD-TotGeomRate [%] | | End-to-End BD-AttrRate [%] | | | Geom. BD-TotalRate [%] | | End-to-End BD-TotalRate [%] | | |
|---|---|---|---|---|---|---|---|---|---|---|---|
| Class | Sequence | D1 | D2 | Luma | Chroma Cb | Chroma Cr | D1 | D2 | Luma | Chroma Cb | Chroma Cr |
| cat2-A | 8ivfbv2_loot_vox10 | -3.1% | -3.2% | -22.1% | -26.8% | -32.1% | -7.8% | -7.9% | -9.1% | -12.5% | -16.5% |
| | 8ivfbv2_redandblack_vox10 | 3.5% | 2.9% | -2.0% | -8.9% | -2.2% | 2.1% | 1.2% | 0.7% | -4.1% | 0.7% |
| | 8ivfbv2_soldier_vox10 | -10.9% | -10.4% | -31.2% | -28.7% | -32.1% | -17.0% | -16.4% | -18.1% | -18.1% | -20.0% |
| | queen | -2.4% | -2.3% | -12.8% | -19.0% | -19.7% | -6.7% | -6.6% | -7.2% | -10.9% | -11.5% |
| cat2-B | 8ivfbv2_longdress_vox10 | 2.7% | 2.3% | -2.8% | -5.2% | -4.0% | 0.3% | -0.8% | -0.7% | -2.6% | -1.7% |
| | Cat2-A average | -3.2% | -3.2% | -17.0% | -20.9% | -21.5% | -7.4% | -7.4% | -8.4% | -11.4% | -11.8% |
| | Cat2-B average | 2.7% | 2.3% | -2.8% | -5.2% | -4.0% | 0.3% | -0.8% | -0.7% | -2.6% | -1.7% |
| | Overall average | -2.0% | -2.1% | -14.2% | -17.7% | -18.0% | -5.8% | -6.1% | -6.9% | -9.7% | -9.8% |

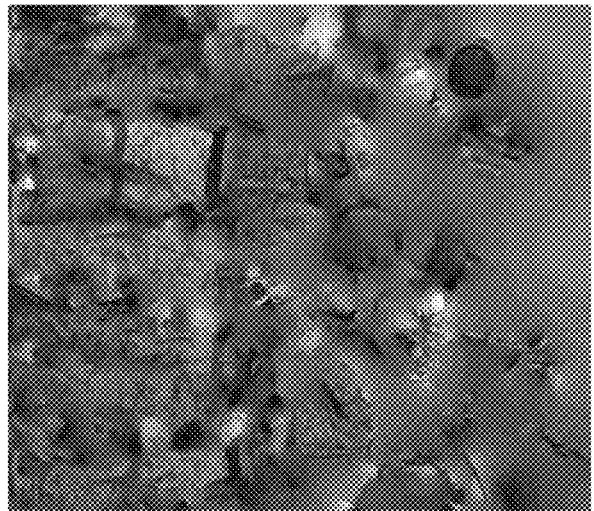

Fig. 1A

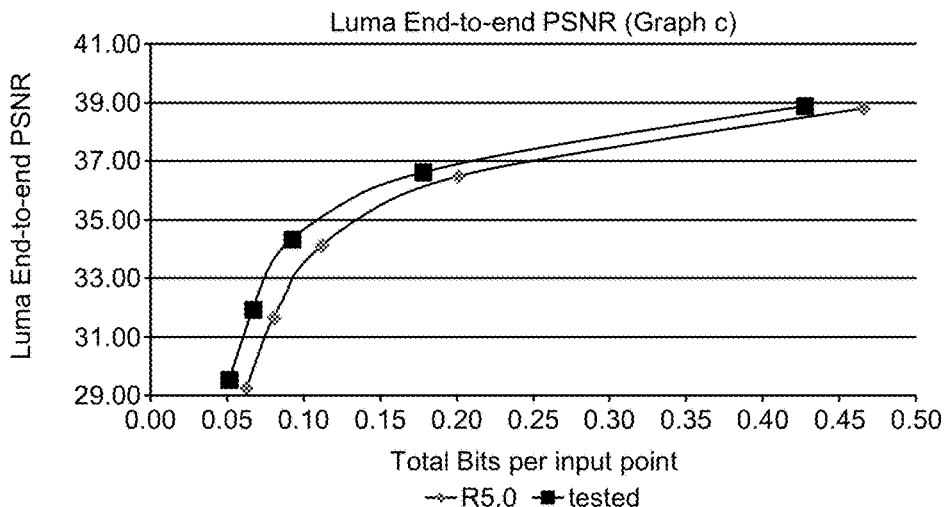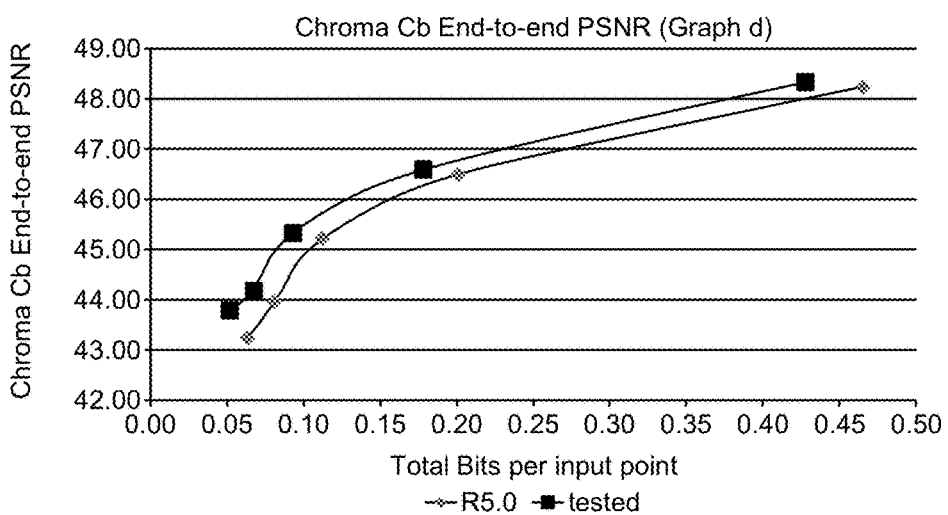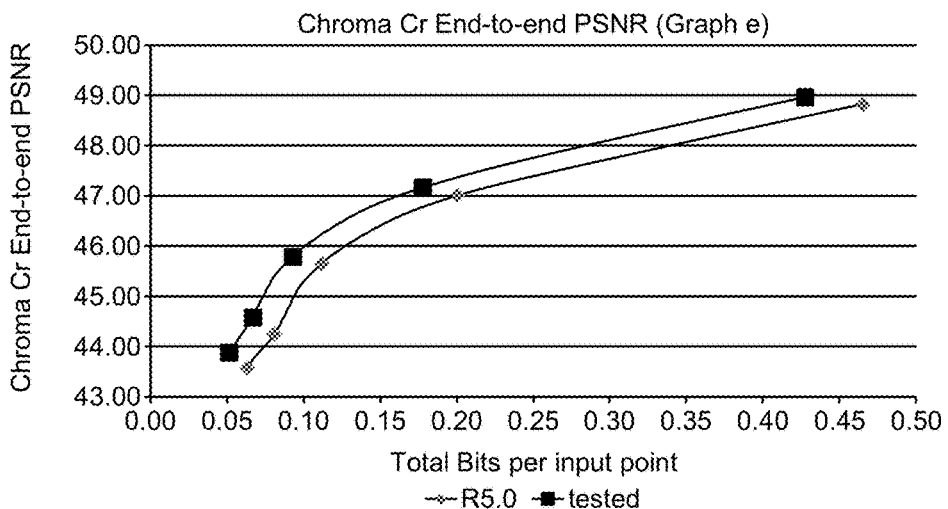
Fig. 1B

POINT CLOUD GLOBAL TETRIS PACKING

CROSS-REFERENCE TO RELATED APPLICATION(S)

This application claims priority under 35 U.S.C. § 119(e) of the U.S. Provisional Patent Application Ser. No. 62/819,856, filed Mar. 18, 2019 and titled, "POINT CLOUD GLOBAL TETRIS PACKING," which is hereby incorporated by reference in its entirety for all purposes.

FIELD OF THE INVENTION

The present invention relates to three dimensional graphics. More specifically, the present invention relates to coding of three dimensional graphics.

BACKGROUND OF THE INVENTION

Point clouds have been considered as a candidate format for transmission of 3D data, either captured by 3D scanners, LIDAR sensors, or used in popular applications such as Virtual Reality/Augmented Reality (VR/AR). Point Clouds are a set of points in 3D space. Besides the spatial position (X,Y,Z), each point usually has associated attributes, such as color (R,G,B) or even reflectance and temporal timestamps (e.g., in LIDAR images). In order to obtain a high fidelity representation of the target 3D objects, devices capture point clouds in the order of thousands or even millions of points. Moreover, for dynamic 3D scenes used in VR/AR application, every single frame often has a unique dense point cloud, which results in the transmission of several millions of point clouds per second. For a viable transmission of such a large amount of data, compression is often applied.

In 2017, MPEG issued a call for proposal (CfP) for compression of point clouds. After evaluation of several proposals, MPEG is considering two different technologies for point cloud compression: 3D native coding technology (based on octree and similar coding methods), or 3D to 2D projection, followed by traditional video coding. In the case of dynamic 3D scenes, MPEG is using a test model software (TMC2) based on patch surface modeling, projection of patches from 3D to 2D image, and coding the 2D image with video encoders such as HEVC. The method has proven to be more efficient than native 3D coding and is able to achieve competitive bitrates at acceptable quality.

When coding point clouds, TMC2 encodes auxiliary information related to the patch projection, such as patch position in the 2D canvas image and bounding box size. For temporal coding of auxiliary information, patch matching between patches from current point cloud and patches from the immediately decoded point cloud is used for prediction. The procedure is limited to the immediate neighbor and includes performing delta coding for all the frames in the sequence.

SUMMARY OF THE INVENTION

A method of mapping 3D point cloud data into 2D surfaces for further efficient temporal coding is described herein. Point cloud global tetris packing utilizes 3D surface patches to represent point clouds and performs temporally consistent global mapping of 3D patch surface data into 2D canvas images.

In one aspect, a method programmed in a non-transitory memory of a device comprises performing patch matching to determine matched patches, generating a double linked list with the matched patches and calculating an accumulated occupancy map and a weight of each patch according to the matched patches. Performing patch matching comprises image processing to compare patches and determine if the patches have a similarity above a threshold. The double linked list indicates if a there is a match with a forward patch and/or a backward patch. Calculating the accumulated occupancy map is generated by OR-ing the matched patches. Calculating the accumulated occupancy map comprises aligning bounding boxes of patches. Calculating the weight of each patch is based on whether there is a backward matched patch and the weight of forward matched patches. The method further comprises ordering patches including the matched patches based on a patch sorting algorithm. The patch sorting algorithm is based on a length of a run, patch size and using an order of a previous frame for the matched patches.

In another aspect, an apparatus comprises a non-transitory memory for storing an application, the application for: performing patch matching to determine matched patches, generating a double linked list with the matched patches and calculating an accumulated occupancy map and a weight of each patch according to the matched patches and a processor coupled to the memory, the processor configured for processing the application. Performing patch matching comprises image processing to compare patches and determine if the patches have a similarity above a threshold. The double linked list indicates if a there is a match with a forward patch and/or a backward patch. Calculating the accumulated occupancy map is generated by OR-ing the matched patches. Calculating the accumulated occupancy map comprises aligning bounding boxes of patches. Calculating the weight of each patch is based on whether there is a backward matched patch and the weight of forward matched patches. The application is further for ordering patches including the matched patches based on a patch sorting algorithm. The patch sorting algorithm is based on a length of a run, patch size and using an order of a previous frame for the matched patches.

In another aspect, a system comprises one or more cameras for acquiring three dimensional content and an encoder for encoding the three dimensional content by: performing patch matching to determine matched patches, generating a double linked list with the matched patches and calculating an accumulated occupancy map and a weight of each patch according to the matched patches. Performing patch matching comprises image processing to compare patches and determine if the patches have a similarity above a threshold. The double linked list indicates if a there is a match with a forward patch and/or a backward patch. Calculating the accumulated occupancy map is generated by OR-ing the matched patches. Calculating the accumulated occupancy map comprises aligning bounding boxes of patches. Calculating the weight of each patch is based on whether there is a backward matched patch and the weight of forward matched patches. The system further comprises ordering patches including the matched patches based on a patch sorting algorithm. The patch sorting algorithm is based on a length of a run, patch size and using an order of a previous frame for the matched patches.

BRIEF DESCRIPTION OF THE DRAWINGS

FIGS. 1A and 1B illustrate patches of a point cloud and results according to some embodiments.

DETAILED DESCRIPTION OF THE PREFERRED EMBODIMENT

Figure 2:
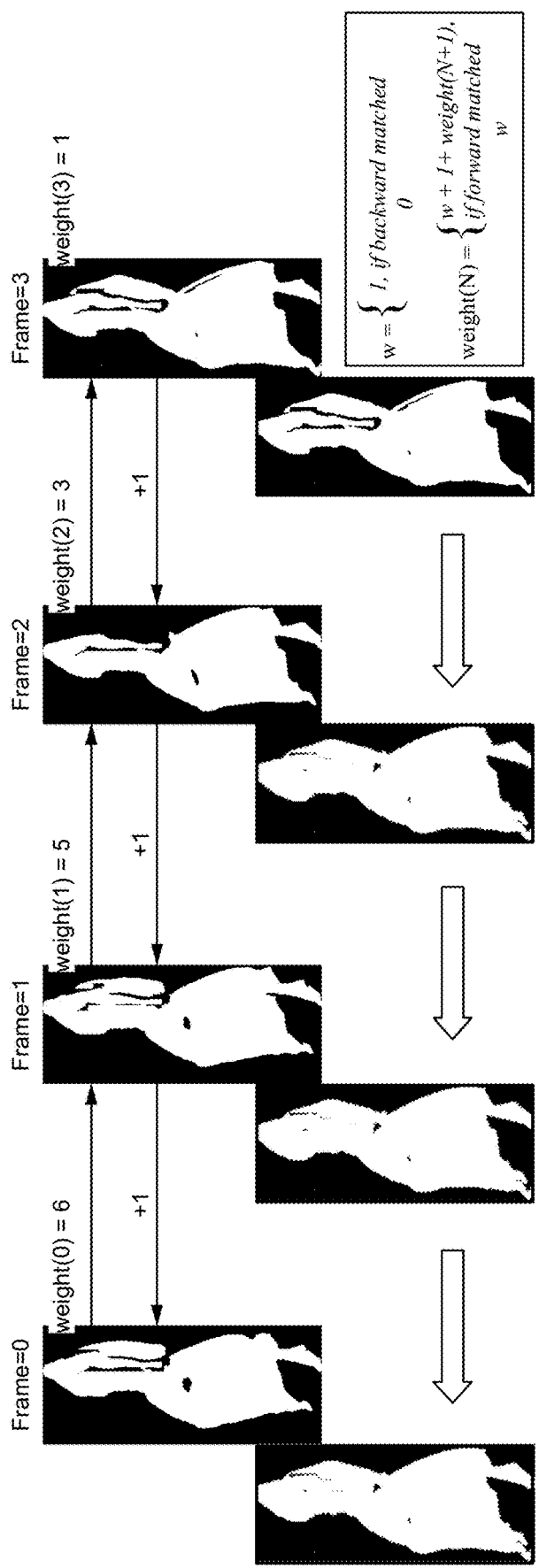
FIG. 2 illustrates a diagram of determining weights and generating accumulated occupancy maps according to some embodiments.

A method of mapping 3D point cloud data into 2D surfaces for further efficient temporal coding is described herein. Point cloud global tetris packing utilizes 3D surface patches to represent point clouds and performs temporally consistent global mapping of 3D patch surface data into 2D canvas images.

In 3D point cloud coding using video encoders, projection from 3D to 2D is used to generate the videos that will represent the point cloud. The most efficient way of generating those videos is using 3D patches, which segments the surface of the object and uses orthogonal projection to generate segmented depth images that are bundled together and used as input of video encoders. In the current point cloud standard, patches are placed in a 2D canvas according to their size in the first frame, and then according to the matched patches in subsequent frames. The method does not guarantee a temporally consistent patch allocation, which decreases the compression efficiency.

A method to perform temporal matching of patches and subsequently sort the patches and place them in the 2D canvas, in a way that guarantees temporal consistency between matched matches is described herein. The method identifies longer runs of matched patches by a novel weight calculation, and prioritizes the allocation of such patches. Furthermore, patches are arranged so that they are able to maintain a consistent 3D position relative to their matched patches even across frames.

FIGS. 1A and 1B illustrate patches of a point cloud and results according to some embodiments. For example, patches (or segments) of a point cloud are mapped to a 2D surface.

When a point cloud is segmented, in time, many patches are similar to each other, and when patches are similar, they are considered to be matched patches. A patch or patches are searched for in one or more subsequent frames. The patches are placed on the 2D canvas in a manner that is consistent temporally. Therefore, if a patch is the same (e.g., a match is found), then the patch should be placed in the same position, so that in the next frame, the patch is in the same position. For example, in a video of a soldier with a helmet, the helmet is constant through time, so the helmet is able to be placed in the same position in the 2D canvas.

Matching patches are identified in any manner such as using image processing to compare images to determining how similar the images are. For example, if 95% of two images pixels are the same color in the same position, then the images are matching. In another example, other coding and/or positioning matching is implemented to determine if a match is detected. Patches represent surfaces in 3D, segments of the object's surface, and a matching occurs when those surfaces overlap either in the 3D space or in the projected 2D space. For the matching to occur, the bounding boxes should have similar sizes, and overlap as much as possible. In some embodiments, only the geometry information is considered in such cases, and the color information is not taken into account. In some embodiments, both the geometry information and the color information are considered.

A double linked list (or other data structure) is generated and used to store the matched patches (forward and backward). If a match exists going forward in time, then a first arrow (link) is added, and if a match exists going backward in time, then a second arrow (link) is added. When complete, the double linked list indicates which patches match in time.

An accumulated occupancy map and the weight of each patch are calculated according to the matched patches.

FIG. 2 illustrates a diagram of determining weights and generating accumulated occupancy maps according to some embodiments. In the image of Frame 3, the occupancy map indicates which pixels are valid. In the image of Frame 2, the patch is slightly different (e.g., hand has moved). An "OR" operation is performed between the occupancy map of Frame 3 and the occupancy map of Frame 2 which results in the occupancy map. The OR operation results in pixels being filled if the pixel from either occupancy map is a 1. As the occupancy maps are OR-ed together, the occupancy map becomes filled. The resultant occupancy map is used to place the patch, and all of this area is going to be occupied by the patch.

For weight, from the back to front, the last frame is initialized with a weight of 1 if the patch has a backward matched patch; otherwise, the weight is initialized as 0. For the other frames, the same initialization is performed, and a 1+weight of the forward matched patch is added.

For the first frame, a list is sorted according to the weights, and the patches are placed. For the subsequent frames, matched patches are placed first using the same order as the previous frame (for block2Patch), then the rest of the patches are sorted according to their respective weights. Bounding boxes do not have to have the same U0, V0. The placement algorithm is able to be anything (e.g., anchor, flexible orientation, tetris packing).

Figure 3:
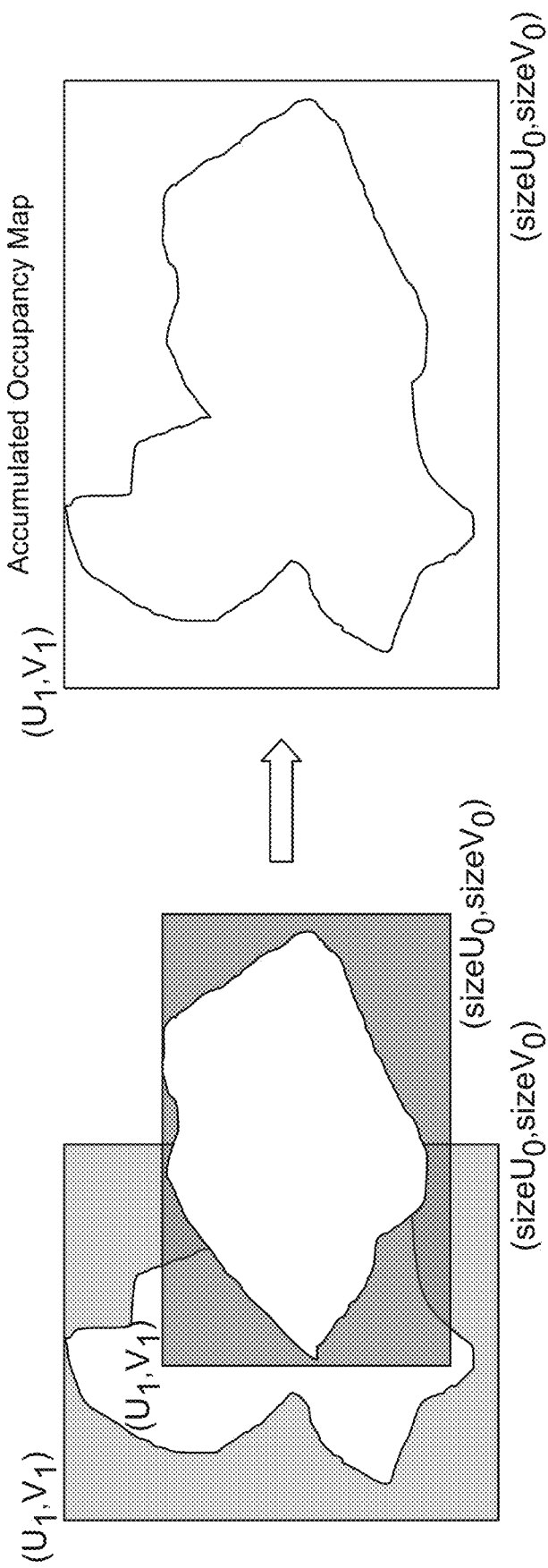
FIG. 3 illustrates a diagram of an accumulated occupancy map according to some embodiments.

FIG. 3 illustrates a diagram of an accumulated occupancy map according to some embodiments. Bounding boxes are aligned based on the 3D coordinates (U1, V1), and then the accumulated occupancy map is estimated by growing the overall affected area.

Figure 4:
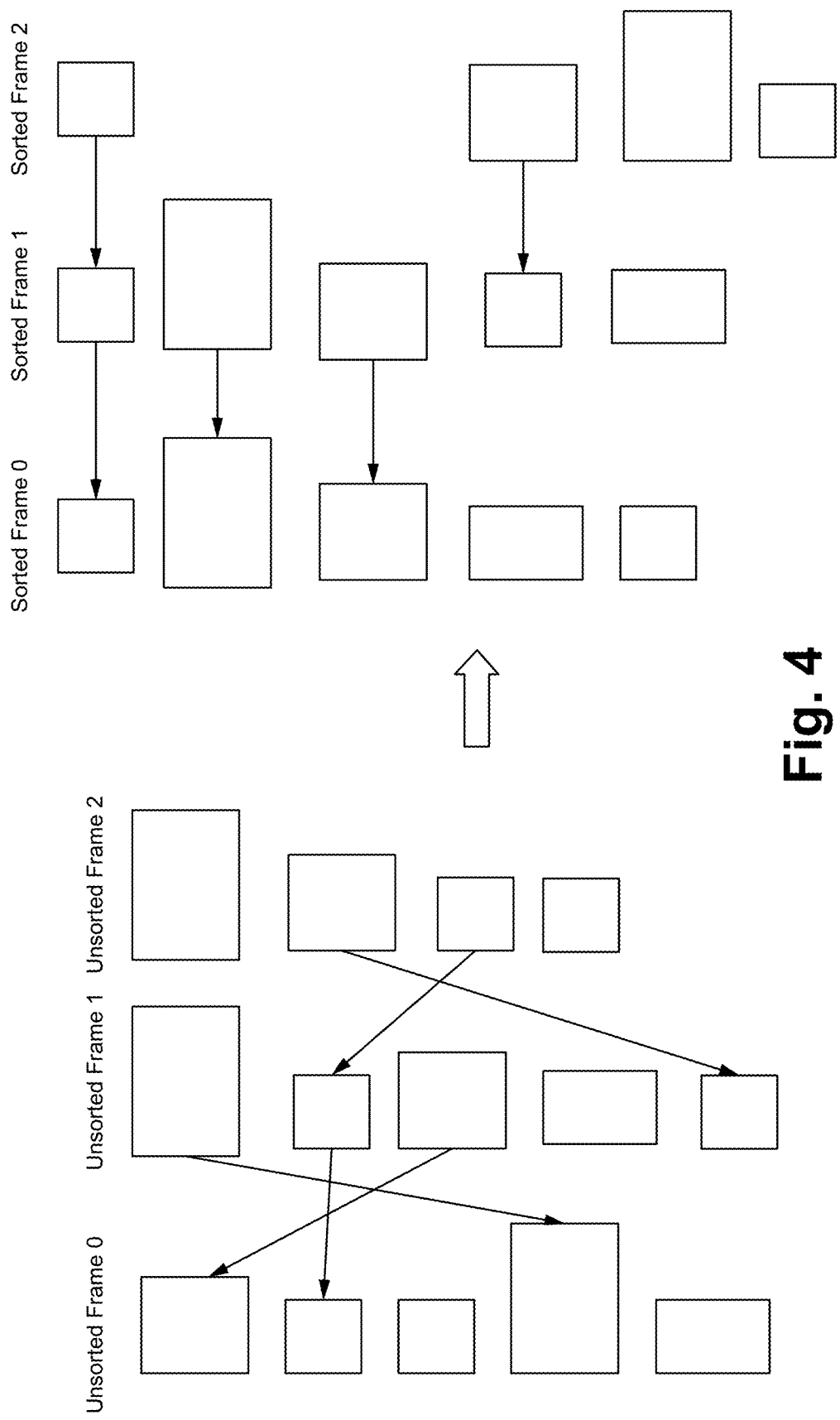
FIG. 4 illustrates a diagram of a patch sorting algorithm according to some embodiments.

FIG. 4 illustrates a diagram of a patch sorting algorithm according to some embodiments. In some embodiments, the sorting algorithm is as follows:
1) sort by longer runs
2) sort by size
3) follow the same order as a previous frame for matched patches.

For example, a run or chain of 3 small patches comes before a run of 2 large patches, and the run of 2 large patches comes before a run of 2 small patches. Chains of patches that match in the time domain are placed first in the 2D canvas, and other patches are not allowed to collide/interfere with them. In some embodiments, the sorting algorithm is different (e.g., sort by size is first).

Figure 5:
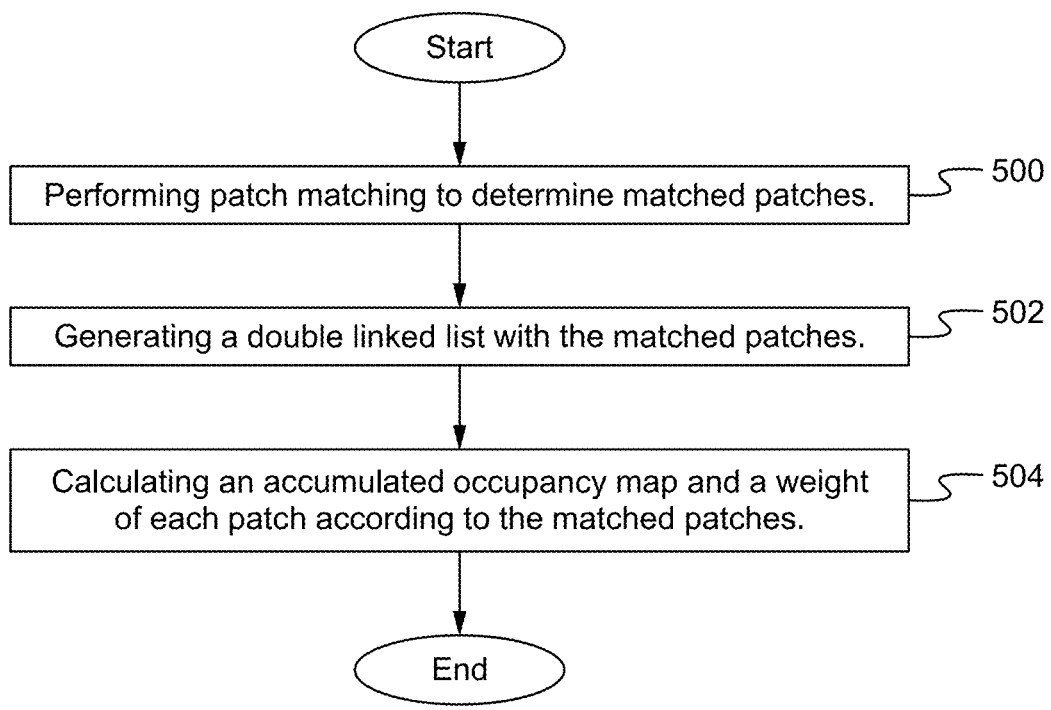
FIG. 5 illustrates a flowchart of a method of implementing point cloud global tetris packing according to some embodiments.

FIG. 5 illustrates a flowchart of a method of implementing point cloud global tetris packing according to some embodiments. In the step 500, patch matching is performed to determine matched patches. Patch matching is implemented in any manner such as using image processing to compare images to determining how similar the images are. For example, if 95% of two images pixels are the same color in the same position, then the images are matching. In another example, other coding and/or positioning matching is implemented to determine if a match is detected. Any image comparison/matching process is able to be used to determine matching patches. In the step 502, a double linked list (or other similar data structure) is generated with the matched patches. The double linked list includes pointers (links) between frames which match. For example if a patch in Frame 3 matches the patch in Frame 2, there are links between the patches in the two frames, and if the patch in Frame 2 matches the patch in Frame 1, then there are links between the patches in Frame 2 and Frame 1, and if the patch in Frame 1 matches Frame 0, there are links between the patches in Frame 1 and Frame 0. In the step 504, an accumulated occupancy map and a weight of each patch are calculated according to the matched patches. The accumulated occupancy map is calculated by OR-ing patches together. For clarity, OR-ing means:

0 OR 0=0,
0 OR 1=1,
1 OR 0=1,
1 OR 1=1.

For example, if a matched patch from Frame 3 and Frame 2 are OR-ed, a first pixel (e.g., upper leftmost pixel) from the patch from Frame 3 is OR-ed with a corresponding pixel (e.g., upper leftmost pixel), and the process continues for the patches until the last pixel (e.g., lower rightmost pixel). Furthering the example, the upper leftmost pixel in the patch in Frame 3 is a 0 and the corresponding pixel in the patch in Frame 2 is a 0, so the accumulated occupancy map has a 0 in as the upper leftmost pixel, but the next pixel is a 1 in Frame 3 and a 0 in Frame 2, so the accumulated occupancy map has a 1 in the next pixel, and so on. Depending on the implementation, the next matching patch (e.g., assuming there are 4 matching patches) is OR-ed with the occupancy map, so that the final occupancy map is the combination of the patches (e.g., 4 patches) OR-ed.

In some embodiments, the accumulated occupancy map is also based on aligning bounding boxes of patches given 3D coordinates (U1, V1) and estimating the accumulated occupancy map by growing the overall affected area.

Determining how the patches are organized/ordered is based on a patch sorting algorithm as described herein (e.g., sorted by longer runs, sorted by size, and following the same order as a previous frame for matched patches).

The weight of each patch is calculated from the back to the front, where the last frame patch has a weight of 1 if it has a backward matched patch; otherwise, the patch has a weight of 0, and then for the other frame patches, the same initialization is performed and a 1+ weight of the forward matched patch is added. For example, the patch of Frame 3 (where patches from Frames 0 to 3 are matched) has a backward matched patch, so it has a weight of 1. Then, Frame 2 has a backward matched patch to Frame 1, so it has a weight of 1+(1+1)=3. Frame 1 has a backward matched patch to Frame 0, so it has a weight of 1+(1+3)=5. Frame 0 does not have a backward matched patch, so it has a weight of 0+(1+5)=6. In some embodiments, fewer or additional steps are implemented. In some embodiments, the order of the steps is modified.

Figure 6:
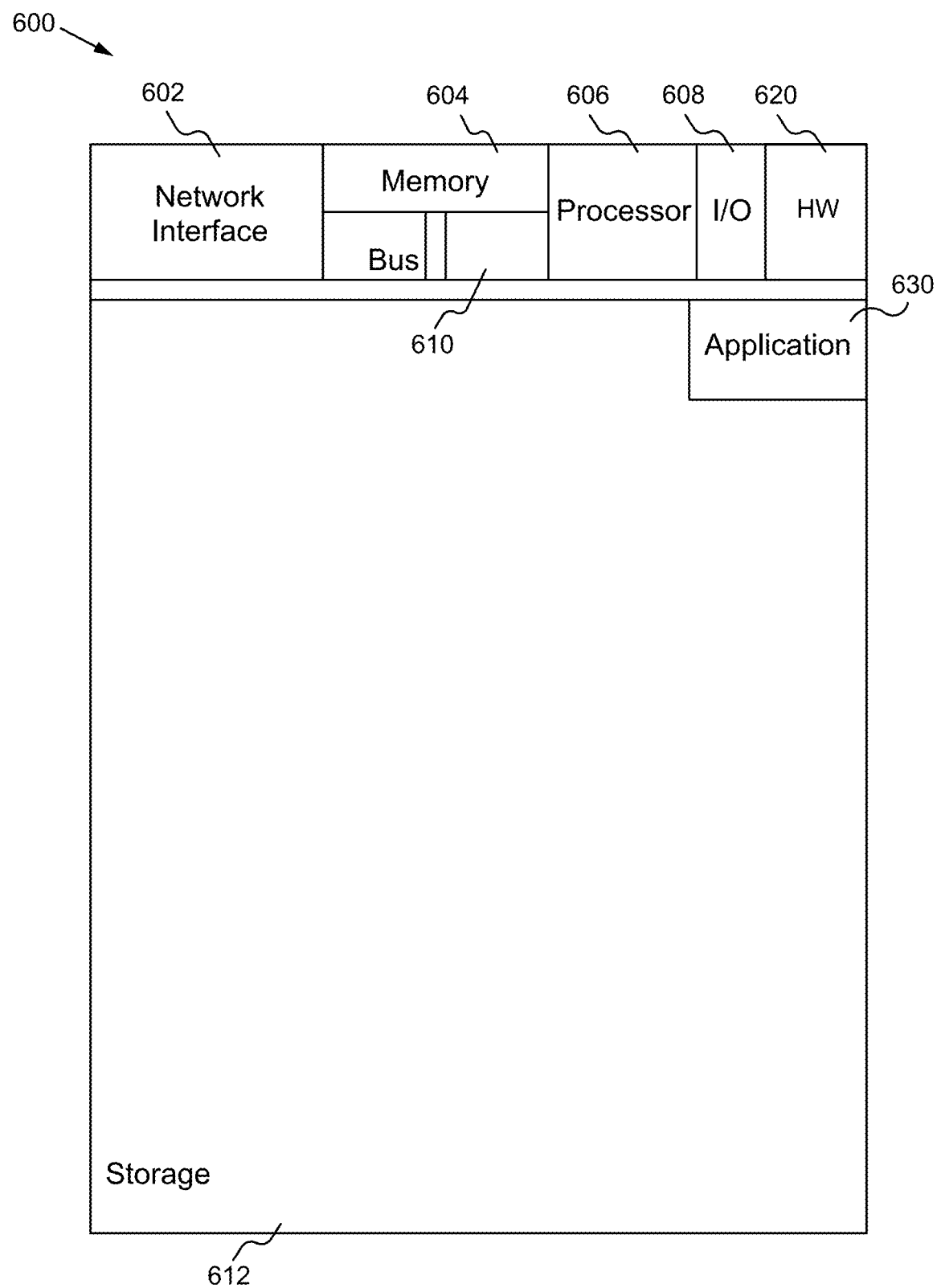
FIG. 6 illustrates a block diagram of an exemplary computing device configured to implement the point cloud global tetris packing according to some embodiments.

FIG. 6 illustrates a block diagram of an exemplary computing device configured to implement the point cloud global tetris packing according to some embodiments. The computing device 600 is able to be used to acquire, store, compute, process, communicate and/or display information such as images and videos including 3D content. The computing device 600 is able to implement any of the point cloud global tetris packing aspects. In general, a hardware structure suitable for implementing the computing device 600 includes a network interface 602, a memory 604, a processor 606, I/O device(s) 608, a bus 610 and a storage device 612. The choice of processor is not critical as long as a suitable processor with sufficient speed is chosen. The memory 604 is able to be any conventional computer memory known in the art. The storage device 612 is able to include a hard drive, CDROM, CDRW, DVD, DVDRW, High Definition disc/drive, ultra-HD drive, flash memory card or any other storage device. The computing device 600 is able to include one or more network interfaces 602. An example of a network interface includes a network card connected to an Ethernet or other type of LAN. The I/O device(s) 608 are able to include one or more of the following: keyboard, mouse, monitor, screen, printer, modem, touchscreen, button interface and other devices. Point cloud global tetris packing application(s) 630 used to implement the point cloud global tetris packing are likely to be stored in the storage device 612 and memory 604 and processed as applications are typically processed. More or fewer components shown in FIG. 6 are able to be included in the computing device 600. In some embodiments, point cloud global tetris packing hardware 620 is included. Although the computing device 600 in FIG. 6 includes applications 630 and hardware 620 for the point cloud global tetris packing, the point cloud global tetris packing is able to be implemented on a computing device in hardware, firmware, software or any combination thereof. For example, in some embodiments, the point cloud global tetris packing applications 630 are programmed in a memory and executed using a processor. In another example, in some embodiments, the point cloud global tetris packing hardware 620 is programmed hardware logic including gates specifically designed to implement the point cloud global tetris packing.

In some embodiments, the point cloud global tetris packing application(s) 630 include several applications and/or modules. In some embodiments, modules include one or more sub-modules as well. In some embodiments, fewer or additional modules are able to be included.

In some embodiments, the point cloud global tetris packing hardware 620 includes camera components such as a lens, an image sensor, and/or any other camera components.

Examples of suitable computing devices include a personal computer, a laptop computer, a computer workstation, a server, a mainframe computer, a handheld computer, a personal digital assistant, a cellular/mobile telephone, a smart appliance, a gaming console, a digital camera, a digital camcorder, a camera phone, a smart phone, a portable music player, a tablet computer, a mobile device, a video player, a video disc writer/player (e.g., DVD writer/player, high definition disc writer/player, ultra high definition disc writer/player), a television, a home entertainment system, an augmented reality device, a virtual reality device, smart jewelry (e.g., smart watch), a vehicle (e.g., a self-driving vehicle) or any other suitable computing device.

To utilize the point cloud global tetris packing method, a device acquires or receives 3D content and processes and/or sends the content in an optimized manner to enable proper, efficient display of the 3D content. The point cloud global tetris packing is able to be implemented with user assistance or automatically without user involvement.

In operation, the point cloud global tetris packing is more efficient in terms of encoding. The improved efficiency is achieved by the placement of patches in the 2D canvas, by enforcing temporal consistency looking at the linked list generated at the encoder side, and by utilizing larger occupancy map (the result of the OR of several single occupancy matches), to reserve the space in the canvas for the patch allocation, and to avoid patch collision.

SOME EMBODIMENTS OF POINT CLOUD GLOBAL TETRIS PACKING

1. A method programmed in a non-transitory memory of a device comprising:
performing patch matching to determine matched patches;
generating a double linked list with the matched patches; and
calculating an accumulated occupancy map and a weight of each patch according to the matched patches.
2. The method of clause 1 wherein performing patch matching comprises image processing to compare patches and determine if the patches have a similarity above a threshold.
3. The method of clause 1 wherein the double linked list indicates if a there is a match with a forward patch and/or a backward patch.
4. The method of clause 1 wherein calculating the accumulated occupancy map is generated by OR-ing the matched patches.
5. The method of clause 1 wherein calculating the accumulated occupancy map comprises aligning bounding boxes of patches.
6. The method of clause 1 wherein calculating the weight of each patch is based on whether there is a backward matched patch and the weight of forward matched patches.
7. The method of clause 1 further comprising ordering patches including the matched patches based on a patch sorting algorithm.
8. The method of clause 7 wherein the patch sorting algorithm is based on a length of a run, patch size and using an order of a previous frame for the matched patches.
9. An apparatus comprising:
a non-transitory memory for storing an application, the application for:
performing patch matching to determine matched patches;
generating a double linked list with the matched patches; and
calculating an accumulated occupancy map and a weight of each patch according to the matched patches; and
a processor coupled to the memory, the processor configured for processing the application.
10. The apparatus of clause 9 wherein performing patch matching comprises image processing to compare patches and determine if the patches have a similarity above a threshold.
11. The apparatus of clause 9 wherein the double linked list indicates if a there is a match with a forward patch and/or a backward patch.
12. The apparatus of clause 9 wherein calculating the accumulated occupancy map is generated by OR-ing the matched patches.
13. The apparatus of clause 9 wherein calculating the accumulated occupancy map comprises aligning bounding boxes of patches.
14. The apparatus of clause 9 wherein calculating the weight of each patch is based on whether there is a backward matched patch and the weight of forward matched patches.
15. The apparatus of clause 9 wherein the application is further for ordering patches including the matched patches based on a patch sorting algorithm.
16. The apparatus of clause 15 wherein the patch sorting algorithm is based on a length of a run, patch size and using an order of a previous frame for the matched patches.
17. A system comprising:
one or more cameras for acquiring three dimensional content; and
an encoder for encoding the three dimensional content by:
performing patch matching to determine matched patches;
generating a double linked list with the matched patches; and
calculating an accumulated occupancy map and a weight of each patch according to the matched patches.
18. The system of clause 17 wherein performing patch matching comprises image processing to compare patches and determine if the patches have a similarity above a threshold.
19. The system of clause 17 wherein the double linked list indicates if a there is a match with a forward patch and/or a backward patch.
20. The system of clause 17 wherein calculating the accumulated occupancy map is generated by OR-ing the matched patches.
21. The system of clause 17 wherein calculating the accumulated occupancy map comprises aligning bounding boxes of patches.
22. The system of clause 17 wherein calculating the weight of each patch is based on whether there is a backward matched patch and the weight of forward matched patches.
23. The system of clause 17 further comprising ordering patches including the matched patches based on a patch sorting algorithm.
24. The system of clause 23 wherein the patch sorting algorithm is based on a length of a run, patch size and using an order of a previous frame for the matched patches.

The present invention has been described in terms of specific embodiments incorporating details to facilitate the understanding of principles of construction and operation of the invention. Such reference herein to specific embodiments and details thereof is not intended to limit the scope of the claims appended hereto. It will be readily apparent to one skilled in the art that other various modifications may be made in the embodiment chosen for illustration without departing from the spirit and scope of the invention as defined by the claims.

What is claimed is:

1. A method programmed in a non-transitory memory of a device comprising:
performing patch matching to determine matched patches;
generating a double linked list with the matched patches; and
calculating an accumulated occupancy map and a weight of each patch according to the matched patches.
2. The method of claim 1 wherein performing patch matching comprises image processing to compare patches and determine if the patches have a similarity above a threshold.
3. The method of claim 1 wherein the double linked list indicates if there is a match with a forward patch and/or a backward patch.

4. The method of claim 1 wherein calculating the accumulated occupancy map is generated by OR-ing the matched patches.

5. The method of claim 1 wherein calculating the accumulated occupancy map comprises aligning bounding boxes of patches.

6. The method of claim 1 wherein calculating the weight of each patch is based on whether there is a backward matched patch and the weight of forward matched patches.

7. The method of claim 1 further comprising ordering patches including the matched patches based on a patch sorting algorithm.

8. The method of claim 7 wherein the patch sorting algorithm is based on a length of a run, patch size and using an order of a previous frame for the matched patches.

9. The method of claim 1 wherein from back to front, a weight of a last frame is initialized to 1 if the patch has a backward matched patch; otherwise, the weight of the last frame is a 0, and for other frames, the frame is initialized the same and a 1+weight of the forward matched patch is added.

10. An apparatus comprising:
a non-transitory memory for storing an application, the application for:
performing patch matching to determine matched patches;
generating a double linked list with the matched patches; and
calculating an accumulated occupancy map and a weight of each patch according to the matched patches; and
a processor coupled to the memory, the processor configured for processing the application.

11. The apparatus of claim 10 wherein performing patch matching comprises image processing to compare patches and determine if the patches have a similarity above a threshold.

12. The apparatus of claim 10 wherein the double linked list indicates if there is a match with a forward patch and/or a backward patch.

13. The apparatus of claim 10 wherein calculating the accumulated occupancy map is generated by OR-ing the matched patches.

14. The apparatus of claim 10 wherein calculating the accumulated occupancy map comprises aligning bounding boxes of patches.

15. The apparatus of claim 10 wherein calculating the weight of each patch is based on whether there is a backward matched patch and the weight of forward matched patches.

16. The apparatus of claim 10 wherein the application is further for ordering patches including the matched patches based on a patch sorting algorithm.

17. The apparatus of claim 16 wherein the patch sorting algorithm is based on a length of a run, patch size and using an order of a previous frame for the matched patches.

* * * * *